(12) United States Patent
Tsai

(10) Patent No.: US 7,128,452 B2
(45) Date of Patent: Oct. 31, 2006

(54) AUTOMOBILE COMPOUND TAILLIGHT

(75) Inventor: Kevin Tsai, Tainan (TW)

(73) Assignee: Lucidity Enterprise Co. Ltd., Tainan (TW)

( * ) Notice: Subject to any disclaimer, the term of this patent is extended or adjusted under 35 U.S.C. 154(b) by 115 days.

(21) Appl. No.: 10/900,670

(22) Filed: Jul. 27, 2004

(65) Prior Publication Data
US 2006/0023466 A1 Feb. 2, 2006

(51) Int. Cl.
B60Q 1/56 (2006.01)
(52) U.S. Cl. ..................................... 362/497
(58) Field of Classification Search ............... 362/543, 362/544, 545, 540, 541, 497, 498, 499
See application file for complete search history.

(56) References Cited
U.S. PATENT DOCUMENTS
2,031,154 A * 2/1936 Fuchs ......................... 362/499

2004/0114391 A1* 6/2004 Watkins et al. ............. 362/542

* cited by examiner

Primary Examiner—Renee Luebke
Assistant Examiner—Julie A. Shallenberger
(74) Attorney, Agent, or Firm—Pro-Techtor Int'l Services

(57) ABSTRACT

An automobile compound taillight includes a main base, a main light base, a side light base, and a bottom light base. The main light base, the side light base and the bottom light base are respectively positioned in the main base at a front opening, a side opening and a bottom opening and then those openings sealed with a main light cover, a side light cover and a bottom light cover. The main light base, the side light base and the bottom light base respectively have an electric circuit board and plural LED lamps. The electric circuit board of the main light base is connected with an electric system of a automobile, and the electric circuit boards of the side light base and the bottom light base are connected with that of the main light base. Thus, the automobile compound taillight can be used as a brake light, a direction one and a tail one separately.

5 Claims, 8 Drawing Sheets

AUTOMOBILE COMPOUND TAILLIGHT

BACKGROUND OF THE INVENTION

1. Field of the Invention

This invention relates to a automobile compound tail light, particularly to one having different lighting functions provided at a rear side of an automobile and composed of a main base, a main light base, a side light base and a bottom base. The tail light has a sealed electric circuit board and a plurality of LED lamps provided respectively in the main light base, the side light bass and the bottom base. This makes the signals completely separate and insulated from the exterior in a waterproof way so as to prolong its service life, and also to be more easily repaired.

2. Description of the Prior Art

A conventional automobile taillight shown in FIG. 1 includes a main base (A), a main light base (B), a main cover (C), a side cover (D), and a bottom cover (E). The main base (A) is opaque, having a position tube (A1) with two threaded holes on an inner surface, and an opening respectively in a front side, a left side and a bottom side, a plurality of female-threaded tubes (A2) in an inner surface of the front opening, a female-threaded tube (A3) respectively at two sides of the left opening, and an engagement groove (A4) in an inner surface of the bottom opening.

The main light base (B) has a hole (B2) respectively at two sides, and a side light base (B1) extending from one side, and a light bulb is respectively fitted in the main light base (B) and the side light base (B2). The main cover (C) is colored and transparent, having a raised circular surface in the center portion. The side cover (D) is colored and transparent, having a hole respectively at two sides. The bottom cover (E) is not colored and transparent, having plural projections (E1) on two side edges. The bottom cover (E) is received in the interior of the main base (A), with the projections (E1) fitting in the engage grooves (A4) of the main base (A) by means of outer pressure of the bottom opening of the main base (A).

The main light base (B) is fixed with the bottom base (A) by screws (F) inserted through the holes (B2), engaging with the position tubes (A1), and protruding outward from the bottom base. Further, the side light base (B1) faces the left side opening of the main base (A) and the main light base (B) faces the front opening of the main base (A). The main cover (C) closes up the front opening of the bottom base (A), with screws (G) passing through the holes (C1) and then engaging with the female-threaded tubes (A2). Further, the side cover (D) closes up the side opening of the bottom base (A), with screws (H) passing through the holes (D1) and engaging with the female-threaded tubes (A3). In addition the whole taillight is secured above a license plate by the screws (F) also engaging the license plate frame and washers.

However, the conventional automobile compound tail light makes use of the light bulb in the main light base to shine through the main cover, so as to function as a brake light, a direction light, and at the same time shining through the bottom cover to cast light on the license plate. In addition, the light bulb in the side light base shines through the side cover to function as a side-indicating light. The main base is enclosed by the main cover, the bottom cover and the side cover; and has an open interior to permit the main cover, the bottom cover and the side cover shine at the same time when the light bulb of the main light base is lit up. Thus, the lamp light beam is shot out through the three sides of the main base, making it impossible to represent the exact function of any single indication. Moreover, the light beam that the conventional light bulb gives out is quite weak, not meeting the complete needs of the modern traffic safety regulations. And in addition, the conventional light bulb and the main light base are not processed with waterproof means, and are apt to cause breakage in case of high temperature or water leakage in case of raining.

SUMMARY OF THE INVENTION

This invention has been devised to offer an automobile compound taillight improving the flaws of the conventional one.

One feature of the invention is a main base of an opaque square case shape, to be fixed on a license plate frame above a license plate, having an opening respectively in a front side, a left side and a bottom side and sealed with a main light cover, a side light cover, and a bottom light cover. The main base further has plural position bars spaced apart around the inner surface of the front opening, and a circular wall on the center portion of a rear surface of the main light cover.

Another feature of the invention is the main light base, positioned in the main base at the front opening, shaped as a opaque square dish, having a chamber in the center portion of a front surface, an electric circuit board and plural LED lamps arranged in the chamber. The chamber has a cord groove formed in an upper side, and a curved wall on two opposite sides, a position groove formed in the center portion of each curved wall. Further a hole is provided respectively at four corners of the main light base, and a first fixing member is fixed at the right side of the rear surface, and a second fixing member at the bottom of the rear surface.

Another feature of the invention is the side light base of an opaque elongate dish shape, positioned at the side opening of the main base, having a chamber opening outward, an electric circuit board and plural LED lamps in the chamber, a cord groove formed in a bottom, and a pair of U-shaped fitting walls formed in a front surface.

The last feature of the invention is the bottom light base of an opaque elongate dish shape, positioned in the main base at the bottom opening, having a chamber opening downward, two fitting tubes protruding through the upper wall and forming a glue blocking wall extending rearward, an electric circuit board and plural LED lamps in the chamber and a cord groove formed in a rear surface.

In this way, the automobile compound tail light can show distinct light signals for braking, a running direction, and the tail of the automobile, and can be repaired easily.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
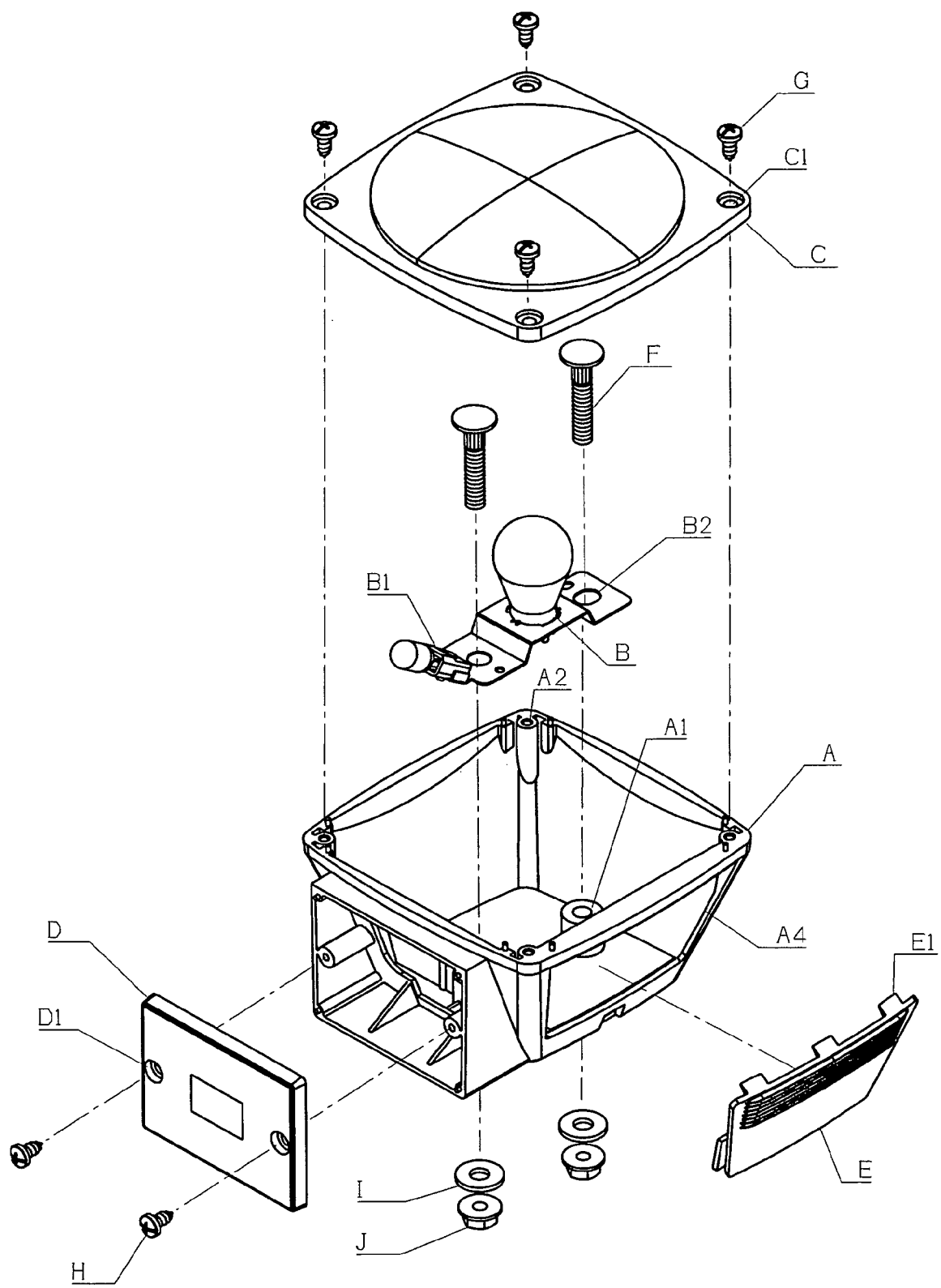
FIG. 1 is an exploded perspective view of a conventional automobile compound taillight.
Figure 2:
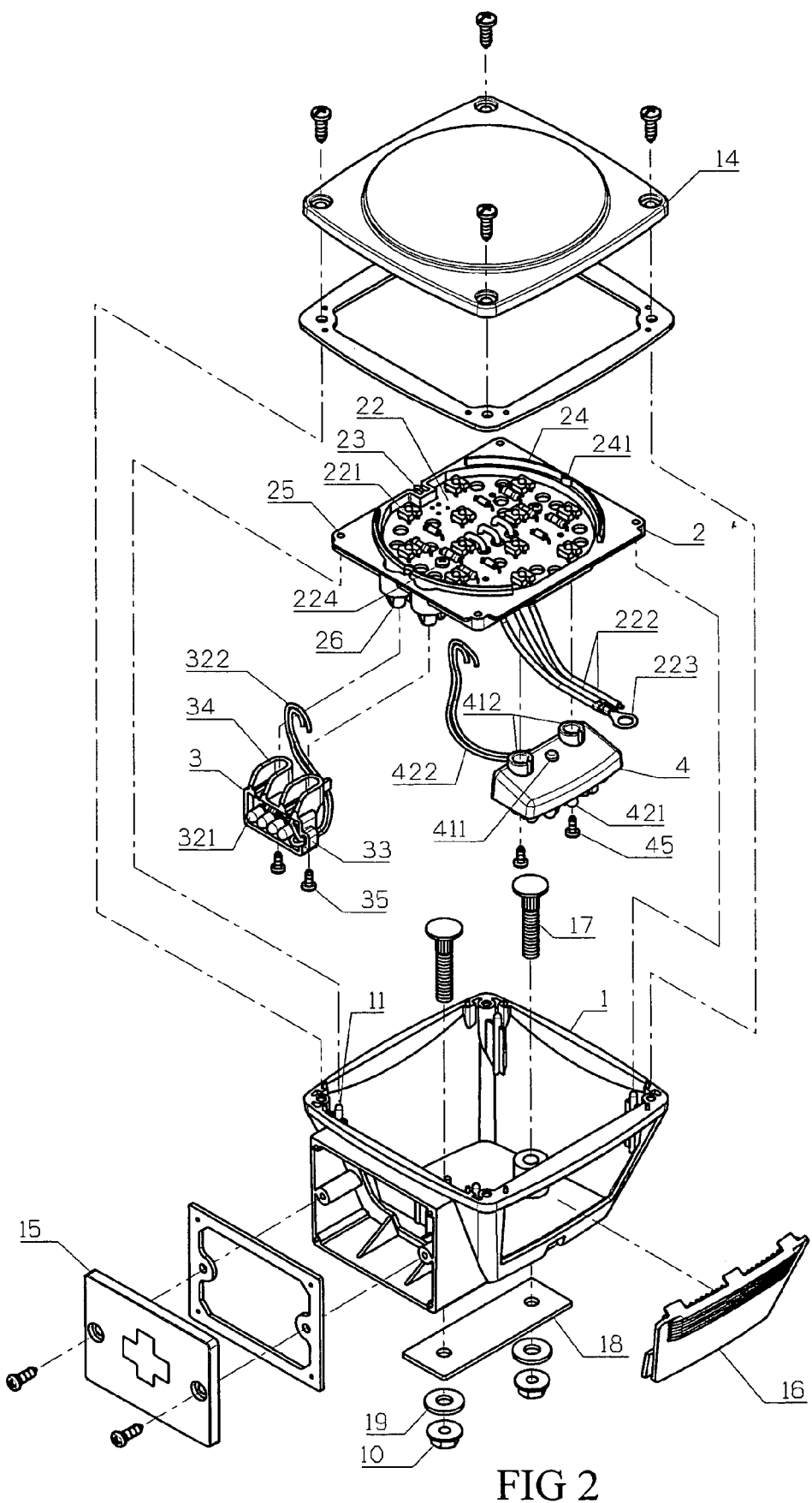
FIG. 2 is an exploded perspective view of an automobile compound tail light in the present invention.
Figure 3:
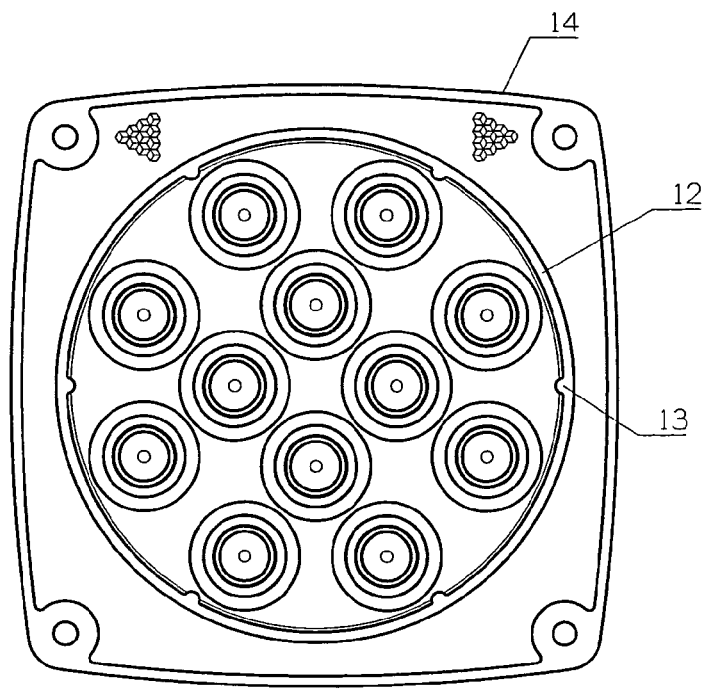
FIG. 3 is a rear view of a main light cover of a main base in the present invention.

A preferred embodiment of an automobile compound tail light in the present invention, as shown in FIG. 2, includes a main base 1, a main light base 2, a side light base 3 and a bottom light base 4 as main components combined together.

Figure 12:
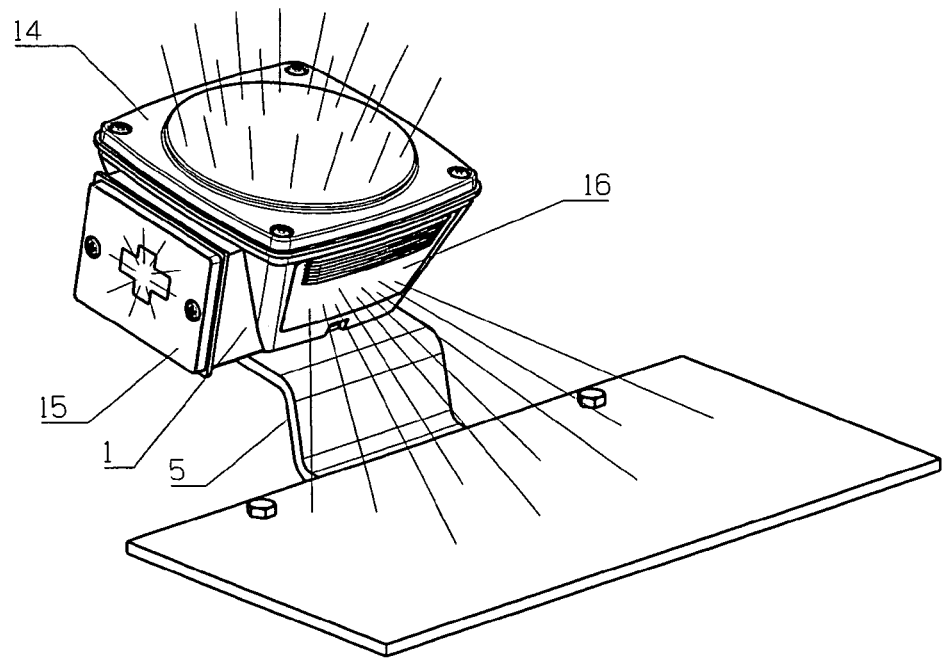
FIG. 12 is a perspective view of the compound taillight fixed on a license plate frame in the present invention.
Figure 13:
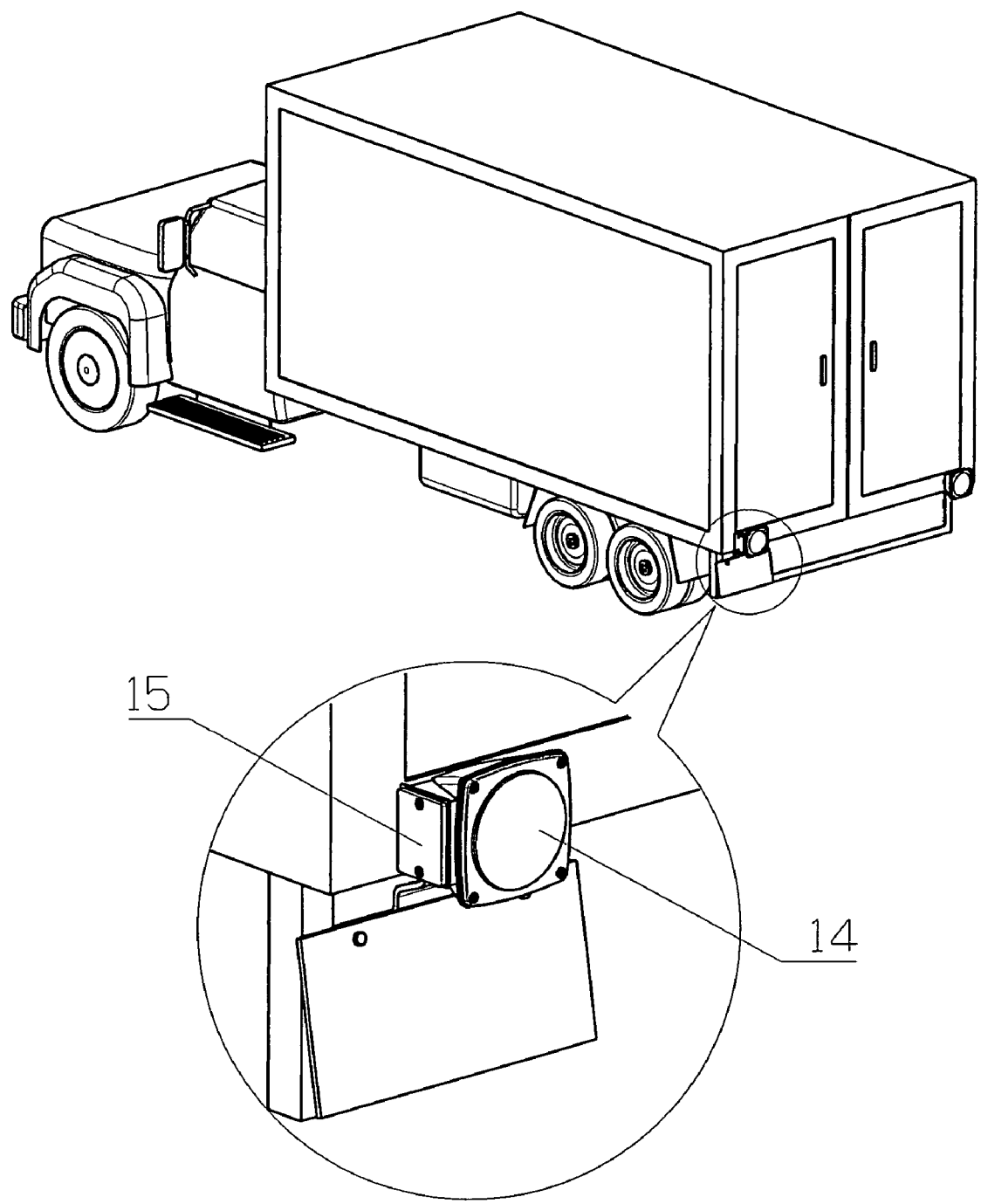
FIG. 13 is a perspective view of the compound tail light with the license plate frame together fixed on an automobile in the present invention.

The main base 1 is opaque and shaped as a case, possible to be fixed on a license plate frame and just above the license plate, having an opening respectively in a front side, a left side, and a bottom side. These openings are sealed up respectively by a main light cover 14, a side light cover 15 and a bottom light cover 16 in the same way as the conventional one. Then bolts 17 protrude, with an extended portion, through the main base 1 and then pass through a gasket 18, a license plate frame 5, a washer 19, and engage with nuts 11, as shown in FIGS. 12 and 13. The main light cover 14 has an annular wall 12 in the center portion, and a position stud 13 respectively at two inner opposite sides of the annular wall 12.

Figure 4:
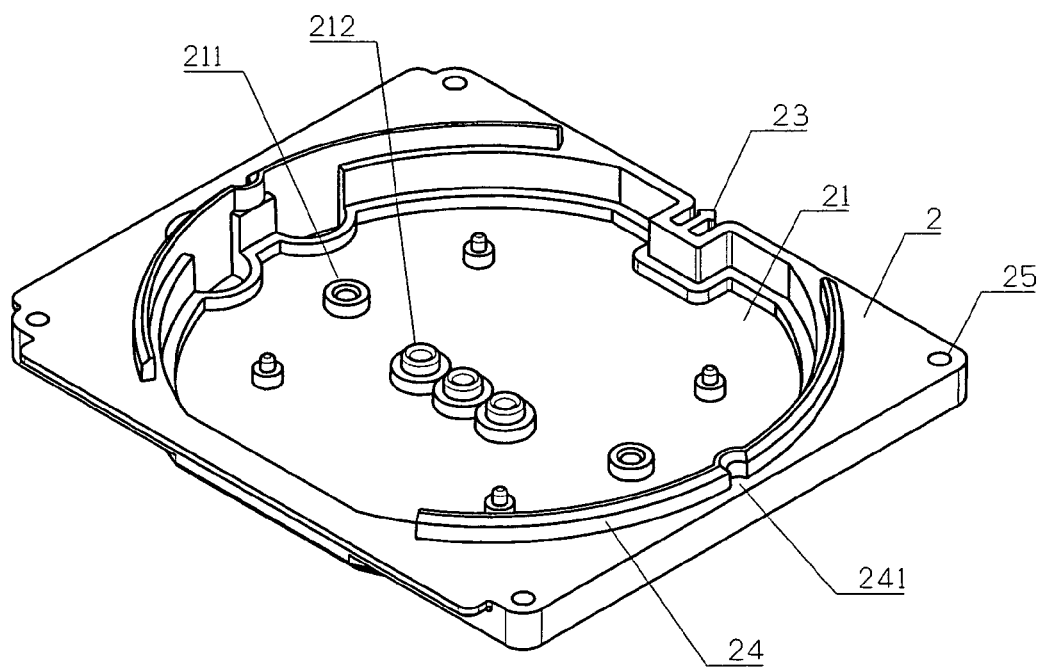
FIG. 4 is a perspective view of the main light base in the present invention.

The main light base 2 is opaque and shaped square, as shown in FIG. 4, fitted at the front opening of the main base 1, having a circular chamber 21 on the center portion of the upper surface, a female-threaded tube 211 respectively at two sides of the chamber 21, and three holes 212 between the two female-threaded tubes 211. An electric circuit board 22 and a plurality of LED lamps 221 are positioned in the chamber 21, with two power cords 222 and a grounding wire 223 connected with the electric circuit board 22 in the traditional way. The two power cords 222 and the grounding wire 223 pass through the three holes 212. The electric circuit board 22 is then fixed tightly with the main light base 2 by two screws 224 engaging the two female-threaded tubes 211, and then they are sealed with waterproof glue.

Further, the chamber 21 is provided with two cord grooves 23 in an upper surface and a projecting curved wall 24 respectively at two opposite sides of the chamber 21 for the annular wall 12 to fit with securely. The two curved walls 24 respectively have a position groove 241 in the intermediate portion for the position projections 13 of the annular wall 12 to fit in, and the main light base 2 is provided with a hole 25 at every corner regularly for the plural position small bars 11 of the bottom base 1 to fit in so as to secure the main light base 2 with the main base 1.

Figure 5:
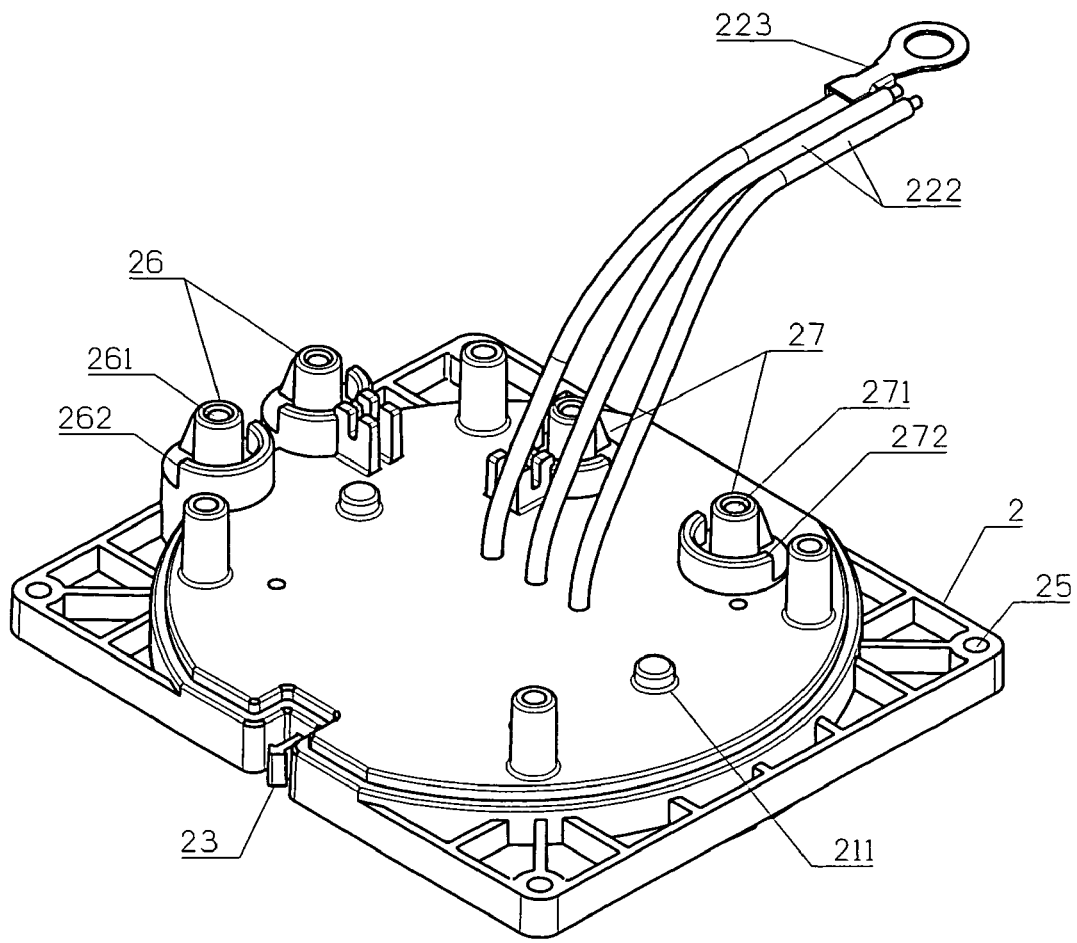
FIG. 5 is a rear perspective view of the main light base in the present invention.
Figure 6:
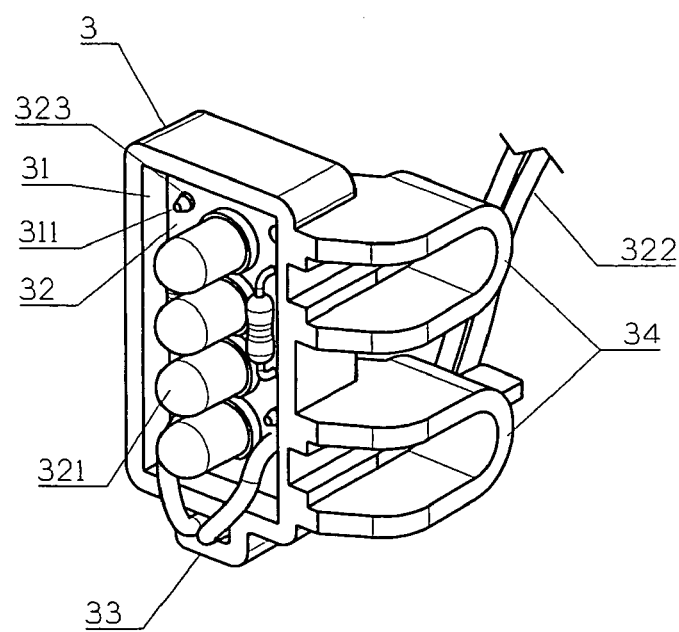
FIG. 6 is a perspective view of a side light base in the present invention.
Figure 7:
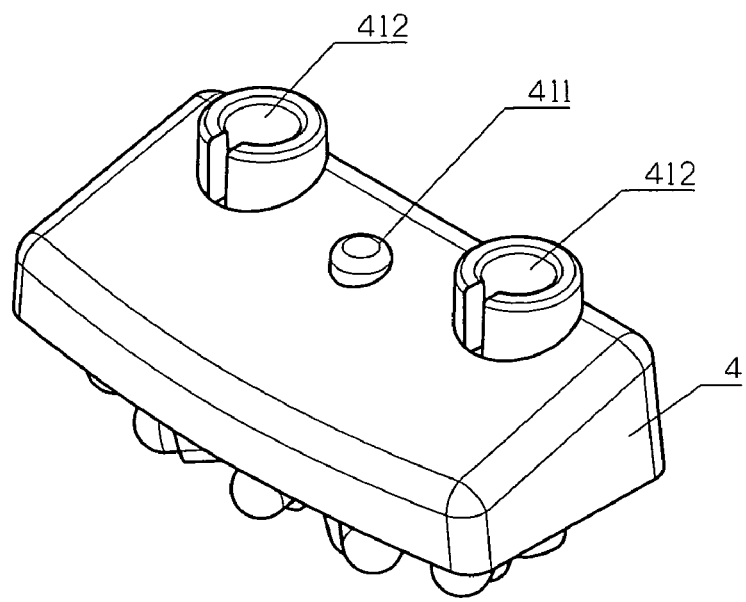
FIG. 7 is a perspective view of a bottom light base in the present invention.
Figure 8:
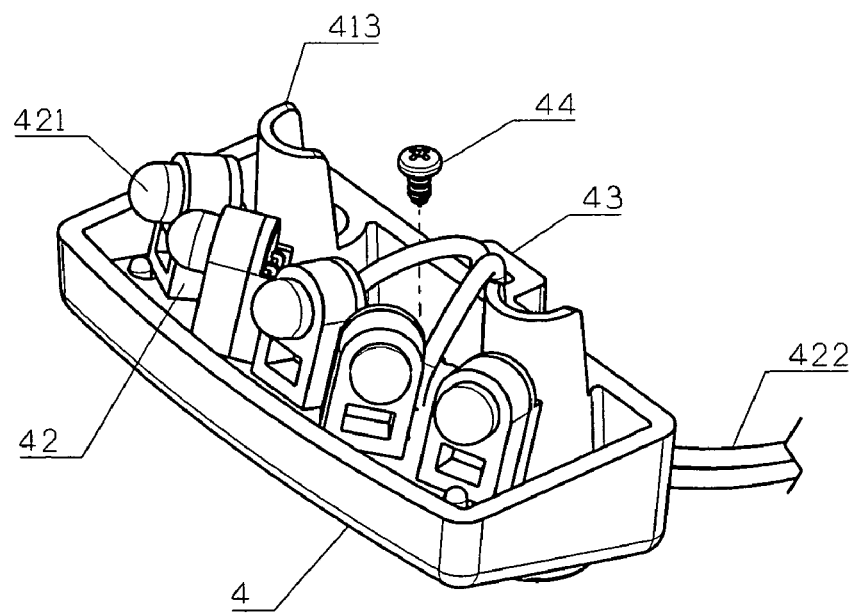
FIG. 8 is a rear perspective view of the bottom light base in the present invention.
Figure 9:
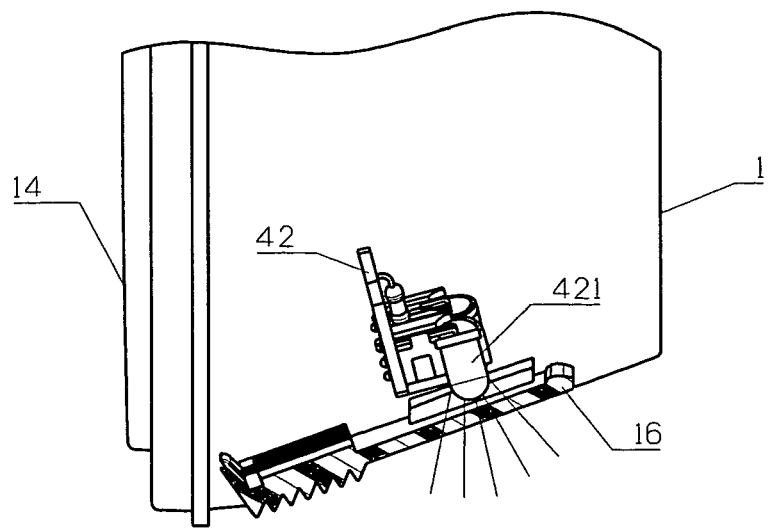
FIG. 9 is a perspective view of the right side of the bottom light base in the present invention.
Figure 10:
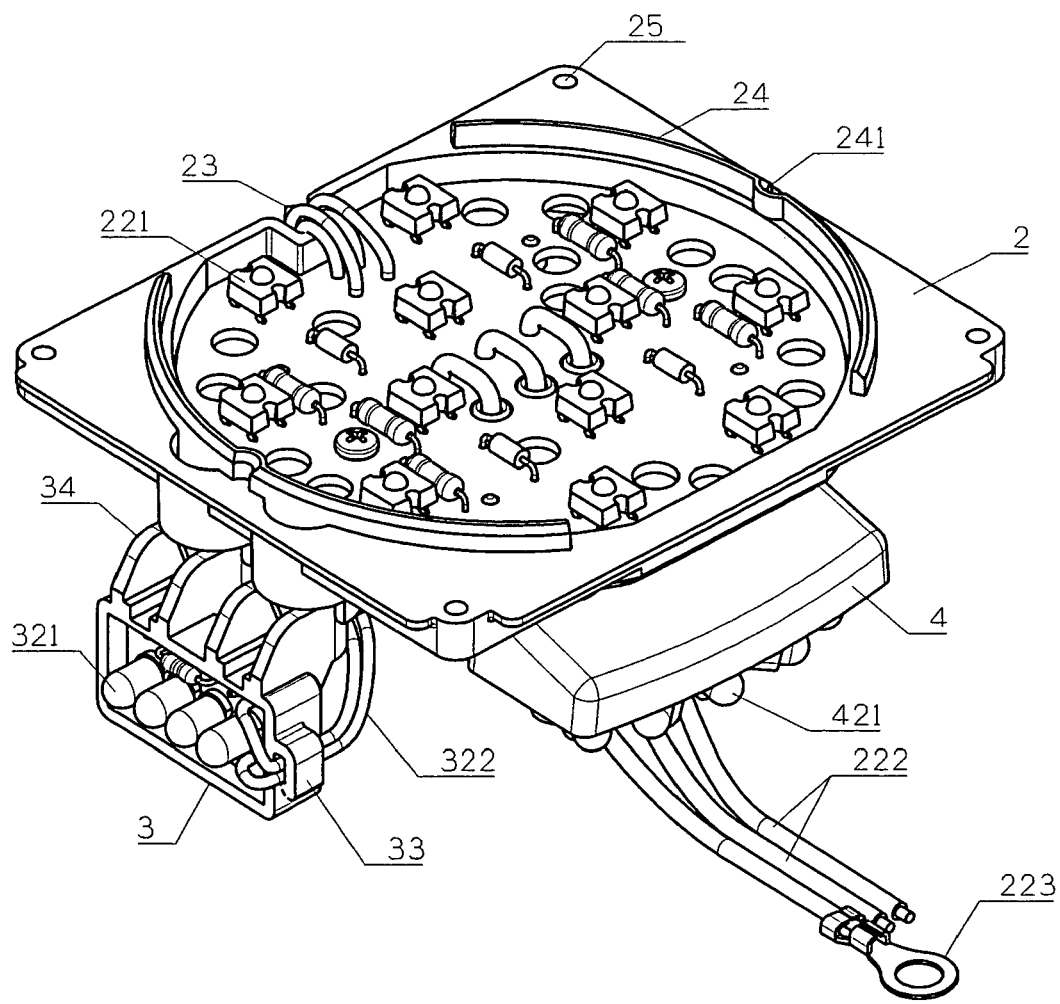
FIG. 10 is a perspective view of the main light 10 base, the side light base and the bottom light base combined together in the present invention.
Figure 11:
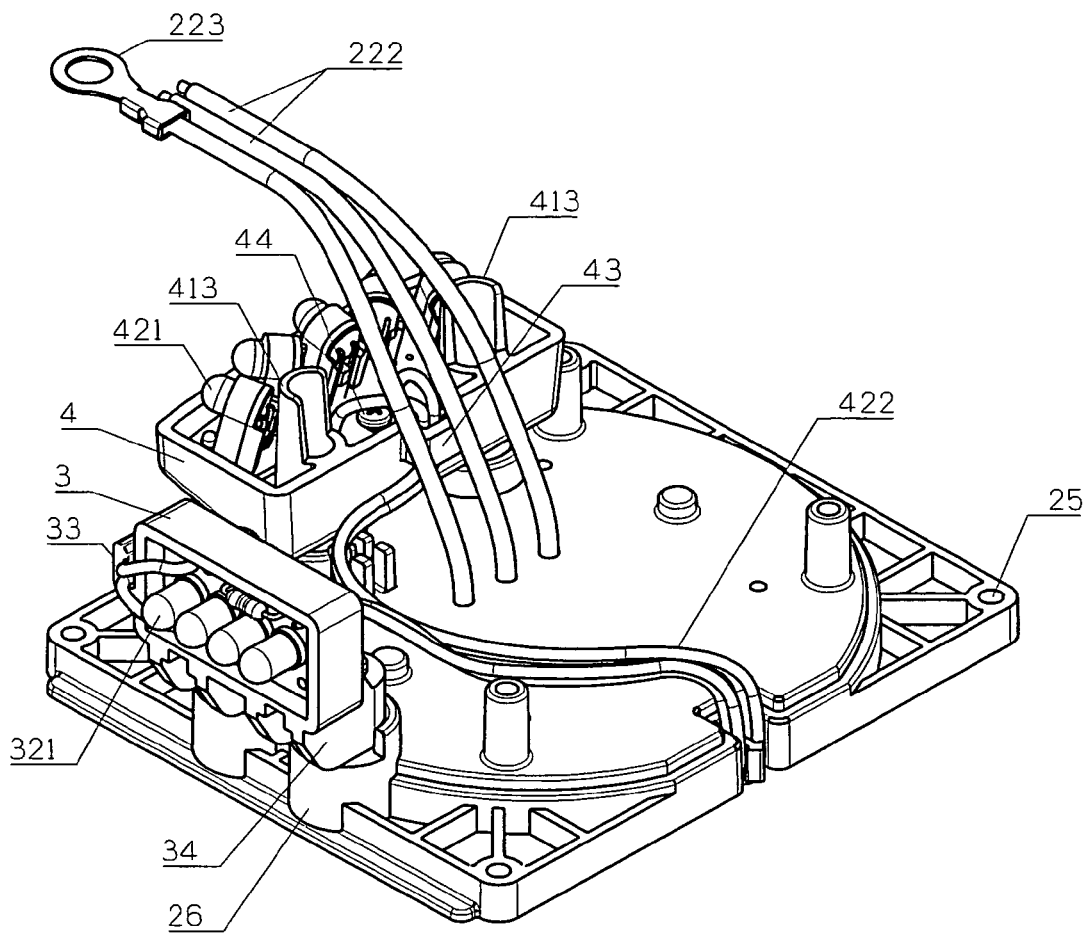
FIG. 11 is a rear perspective view of the main light base, the side light base and the bottom light base combined together in the present invention.

Further, as shown in FIG. 5, a first fixing member 26 is fixed on the right side of the main light base 2, provided with two small bars 262 and helical washers 262 a little separated from the small bars 262. A second fixing member 27 is fixed on the lower side of the rear portion of the main light base 2, provided with two small bars 271 and two helical washers 272 as the first fixing member 26.

The side light base 3 is opaque and shaped as a rectangular dish, as shown in FIGS. 1, 6, 9 and 10, fitted at the side opening, and having a chamber 31 with an opening facing outward. The chamber 31 is provided in the inside with plural insert bars 311, and an electric circuit board 32 and plural LED lamps 321 are deposited in the chamber 31, with two conductive wires 322 traditionally connected with the electric circuit board 32. Further, the main light base 3 is also provided with a cord groove 33 in the bottom and the electric circuit board 32 has plural bar holes 323 for the plural bars 311 to forcibly fit therein, and then coated with waterproof glue to seal tightly, fixing firmly the conductive wires 322 in the cord groove 33. The conductive wires 322 are fixed in the cord groove 23 of the main light base 2 and then connected with the electric circuit board 22 of the main light base 2. The side light base 3 further has a U-shaped fitting ring 34 that can fit with the first fixing member 26 and fastened tightly with screws 35.

The bottom light base 4 is opaque, with a rectangular shape, and has its bottom surface inclined, as shown in FIGS. 7,8,10 and 11. The bottom light base 4 is provided with a chamber 41 opening downward and a female-threaded tube 411 extending upward through a front portion of the upper wall of the chamber 41. A pair of fitting tubes 412 protrude through the upper wall and are respectively provided with a semicircular wall 413 formed to extend down in the chamber 41. The top of the fitting tubes 412 fits with the second fixing member 27 and is secured firmly with screws 45. An electric circuit board 42 and plural LED lamps 421 are arranged in the chamber 41, and the electric circuit board 42 is traditionally connected with the plural LED lamps 421 with two conductive wires 422. The bottom light base 4 further has a cord groove 43 in a rear portion, and the electric circuit board 42 is fixed with the fitting tube 411 with a screw 44 and coated with waterproof glue to seal tightly. The pair of the semicircular walls 413 of the fitting tube 412 can block waterproof glue from flowing into the fitting tube 412. The conductive wires 422 are tightly fixed in the cord groove 43, extending through and fixed tightly in the cord groove 23 of the main light base 2 and are connected with the electric circuit board 22 of the main light base 2.

While the preferred embodiment of the invention has been described above, it will be recognized and understood that various modifications may be made therein and the appended claims are intended to cover all such modifications that may fall within the spirit and scope of the invention.

What is claimed is:

1. An automobile compound tail light comprising:

A bottom base of an opaque rectangular case shape for mounting on a license plate frame and positioning just above a license plate of an automobile, said bottom base having an opening in an upper side, an opening in a left side and an opening in a bottom side, said openings being respectively sealed with a main light cover, a side light cover and a bottom light cover;

a main light base of an opaque square shape and deposited behind the front light cover of the front opening, said main light base having a nearly circular chamber in an upper center portion, an electric circuit board and plural LED lamps arranged securely in the chamber and sealed with waterproof glue, said electric circuit board connected with an electric system of an automobile with power cords;

a side light base of an opaque elongated dish shape disposed in said main light base at the side opening and behind said side light cover, said main light base having a chamber opening outward, an electric circuit board and plural LED lamps arranged securely in said chamber and sealed with waterproof glue, said electric circuit board connected with said electric circuit board of said main light base with conductive wires; and a bottom light base of a opaque elongated dish shape with an inclined lower side and deposited in said main base at the bottom opening and behind said bottom light cover, said bottom light base having a chamber opening downward, an electric circuit board and plural LED lamps arranged in said chamber and sealed with waterproof glue, said electric circuit board connected with said electric circuit board of said main light base with conductive wires;

wherein said bottom base is provided with plural position bars spaced apart regularly on an inner surface of said upper opening, said main light base has plural holes spaced apart regularly in its circumference, and said position bars of said bottom base fit respectively in said holes of said main light base, securing said main light base with said bottom base.

2. The automobile compound tail light as claimed in claim 1, wherein said main light cover has a circular wall formed on a center portion of a lower surface, a position projection respectively located at two inner opposite sides of said circular wall, said main light base has a curved wall respectively formed at two opposite sides in said chamber and a position groove formed in a center portion of each said curved wall, said position grooves inserted therein by said position projections of said circular wall of said main light cover, said two curved walls of said main light base fitting securely with said circular wall of said main light cover.

3. The automobile compound tail light as claimed in claim 1, wherein said main light base has a first fixing member consisting of two female-threaded rods and two helical washers at the left side of a rear surface, said two female-threaded rods and said two helical washers are separated with a proper gap, said side light base has a group of U-shaped walls extending forward to a front side, said first fixing member fits with said group of U-shaped walls and then secured tightly with the side of said main light base by screws.

4. The automobile compound tail light as claimed in claim 1, wherein said main light base has a second fixing member consisting of two female-threaded rods and two helical washers, as said first fixing member does, said bottom light base has a pair of fixing tubes in said chamber, and said fixing tubes protrude upward through an upper wall of said chamber, said fixing tubes fits with said second fixing member for securing said bottom light base with the bottom of said main light base by screws.

5. The automobile compound tail light as claimed in claim 1, wherein said bottom light base has a pair of fixing tubes in said chamber, said fixing tubes has curved wall formed in said chamber for blocking glue from flowing into said fixing tubes during process of coating waterproof glue on said chamber.

* * * * *